(12) United States Patent
Kuo et al.

(10) Patent No.: US 7,860,178 B2
(45) Date of Patent: Dec. 28, 2010

(54) GUARD SECTION LENGTH DETECTION METHOD AND SYSTEM

(75) Inventors: Chun-Chun Kuo, Hsinchu (TW); Chin-Hung Chen, Tainan (TW); Chao-Kai Wen, Taipei (TW); Pang-An Ting, Taichung County (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 679 days.

(21) Appl. No.: 11/889,958

(22) Filed: Aug. 17, 2007

(65) Prior Publication Data

US 2008/0074991 A1 Mar. 27, 2008

Related U.S. Application Data

(60) Provisional application No. 60/846,103, filed on Sep. 21, 2006.

(51) Int. Cl.
*H04K 1/10* (2006.01)

(52) U.S. Cl. ............... 375/260; 375/343; 375/345; 375/342; 375/348; 375/355; 370/208; 370/516

(58) Field of Classification Search ............... 375/260, 375/345, 343, 285, 342, 348, 355; 370/208, 370/516
See application file for complete search history.

(56) References Cited

U.S. PATENT DOCUMENTS

| | | | | |
|---|---|---|---|---|
| 6,928,048 | B1 * | 8/2005 | Do et al. | 370/208 |
| 7,505,420 | B2 * | 3/2009 | Do et al. | 370/252 |
| 7,577,216 | B2 * | 8/2009 | Zhang | 375/343 |
| 7,672,405 | B2 * | 3/2010 | Lin et al. | 375/345 |
| 7,684,445 | B2 * | 3/2010 | Wang | 370/516 |
| 2004/0223554 | A1 * | 11/2004 | Cha | 375/260 |
| 2008/0019458 | A1 * | 1/2008 | Kuo et al. | 375/285 |

* cited by examiner

*Primary Examiner*—Sudhanshu C Pathak
(74) *Attorney, Agent, or Firm*—Birch, Stewart, Kolasch & Birch, LLP (57) ABSTRACT

A guard section length detection method is disclosed. In the method, a guard section length detection method is used in an OFDM system. The OFDM symbol includes a data interval having a first length, and a guard section having a guard section length. The method detects a first symbol boundary and a second symbol boundary, and determines the guard section length based on a length between the first symbol boundary and the second symbol boundary.

14 Claims, 9 Drawing Sheets

GUARD SECTION LENGTH DETECTION METHOD AND SYSTEM

This Nonprovisional application claims priority under 35 U.S.C. §119(e) on U.S. Provisional Application No(s). 60/846,103 filed on Sep. 21, 2006 the entire contents of which are hereby incorporated by reference.

BACKGROUND OF THE INVENTION

1. Field of the Invention

The invention relates to a guard section length detection method and system.

2. Description of the Related Art

Orthogonal Frequency Division Multiple Access (OFDMA) is a multi-user version of the popular OFDM digital modulation scheme. Multiple accesses are achieved in OFDMA by assigning subsets of subcarriers to individual users. Compared with the conventional single carrier communication system, the OFDM communication system allocates data in several subcarriers, thus, the data transmission speed can be increased. Because the OFDM system is increasingly being used in wireless communication systems, a guard section is used to reduce inter-symbol interference (ISI). Inter-symbol interference (ISI) is a form of signal distortion that causes previously transmitted symbols to have an effect on the currently received symbol. Adding the guard section reduces ISI, but, also reduces transmission efficiency because the guard section does not carry information. If the OFDM symbol length is $N_{FFT}$ points and the guard section length is $N_{GI}$ points, for example, the transmission rate after adding the guard section is $$\frac{N_{FFT}}{N_{FFT} + N_{GI}}$$

of the transmission rate without an added guard section. Generally speaking, ISI can be avoided when the guard section is longer than the channel length and a longer guard section length decreases the transmission rate and cannot increase the OFDM system performance.

As selection of the length of the guard interval depends on the channel condition, the length of the guard interval will dynamically change. For example, the IEEE 802.16 standard defines a guard section having a length of ¼, ⅛, 1/16 or 1/32 (hereinafter, called a ¼ mode, ⅛ mode, 1/16 mode and 1/32 mode) of an actual OFDM symbol length, and the base station selects a proper guard section length based on the channel length and the environment. Thus, a method for synchronizing the guard section parameter between the transmitter and the receivers is desirable.

BRIEF SUMMARY OF THE INVENTION

In one embodiment, a guard section length detection method used in an OFDM system is provided, wherein an OFDM symbol comprises a data interval having a first length, and a guard section having a guard section length. The method comprises detecting a first symbol boundary; detecting a second symbol boundary, and determining the guard section length based on a length between the first symbol boundary and the second symbol boundary.

In another embodiment, a guard section length detection system used in an OFDM system is provided, wherein an OFDM symbol comprises a data interval having a first length, and a guard section comprising a plurality of guard section lengths. The guard section length detection system comprises a first boundary detection unit, a second boundary detection unit, and a guard section length detection unit. The first boundary detection unit receives an OFDM signal to detect a first symbol boundary. The second boundary detection unit receives the input OFDM signal from the first boundary detection unit to detect a second symbol boundary. The guard section length detection unit determines the guard section length base on the length between the first symbol boundary and the second symbol boundary.

In another embodiment, a guard section length detection method for an OFDM system is provided, wherein an OFDM symbol comprises a data interval having a first length, and four guard sections respectively referred to as ¼ mode, ⅛ mode, 1/16 mode and 1/32 mode guard sections. The method comprises detecting a first symbol boundary; determining the four OFDM symbol lengths of the four guard sections; calculating signal correlation values at the positions having a distance of at least two OFDM symbol lengths from the first symbol boundary; determining an actual guard length in response to the signal correlation value when the signal correlation value is a local maximum signal correlation value or a maximum signal correlation value.

In another embodiment, a guard section length detection method for an OFDM system comprises detecting a first guard section in a first packet; detecting a second guard section in a second packet; if the first guard section length and the second guard section length are the same, the guard section length for the OFDM system is the first guard section; if the first guard section length and the second guard section length are not the same, detecting a third guard section in a third packet. If the third guard section length is the same as either the first or the second guard section length, the guard section length for the OFDM system is the third guard section.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

For example, in the 802.16e standard (Orthogonal Frequency Division Multiplexing Access, OFDMA), only one preamble is provided, thus, the conventional guard section detection method only based on preambles is not applicable. The invention thus provides a proper guard section detection method for an OFDM-based system.

Figure 1:
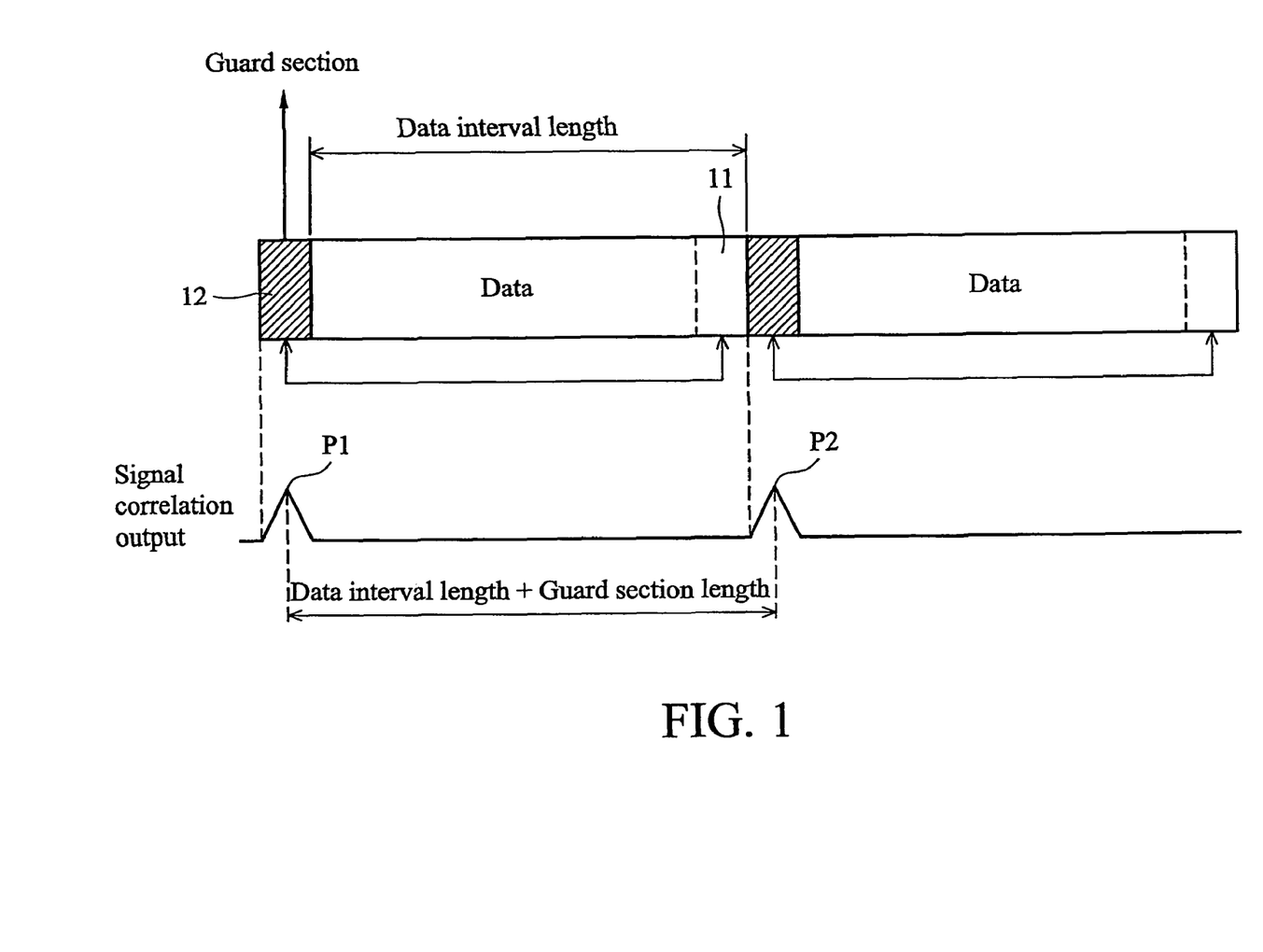
FIG. 1 shows a signal correlation output schematic diagram based on an OFDM symbol.
Figure 2:
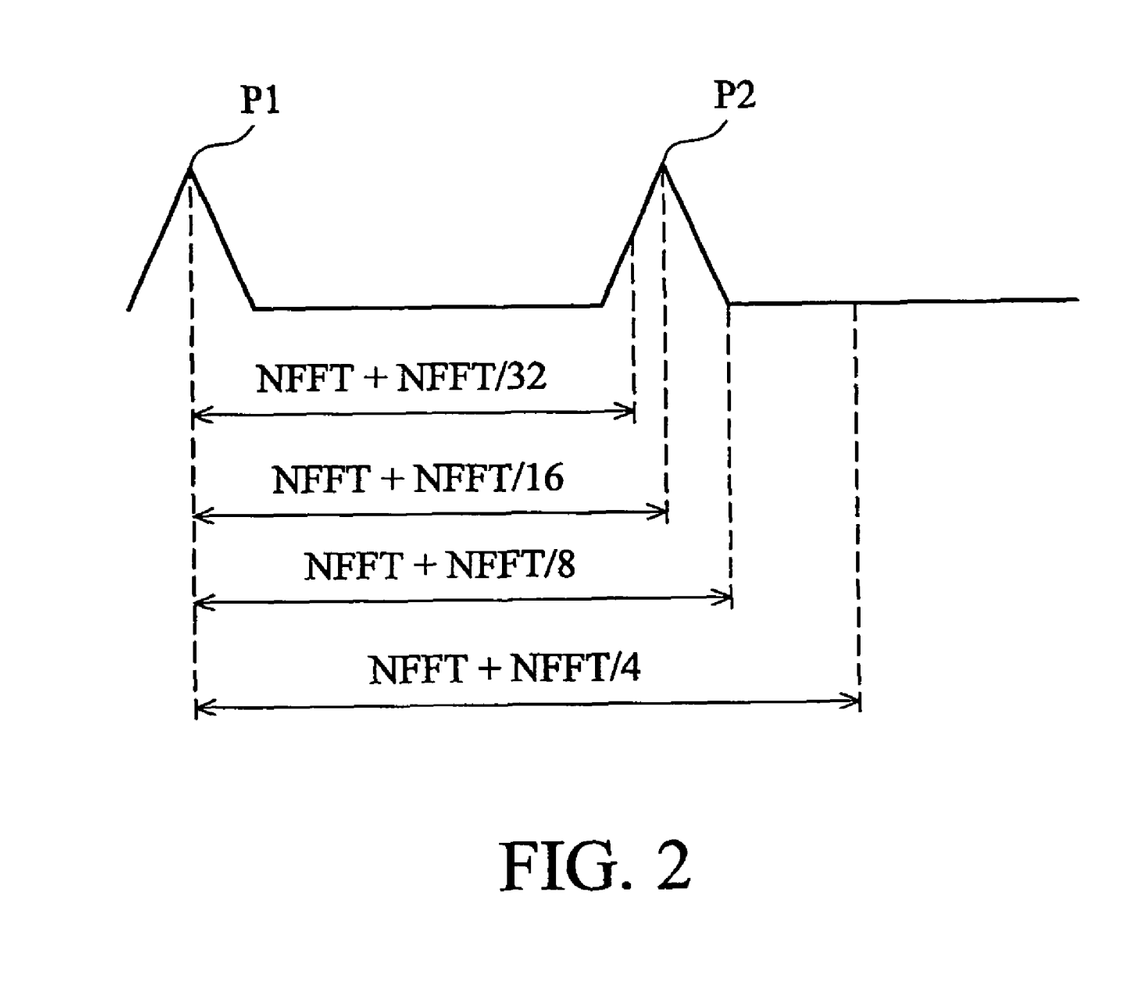
FIG. 2 shows a signal correlation output diagram for an OFDM symbol in 1/16 mode.

In FIG. 1, a signal correlation output schematic diagram based on an OFDM symbol is illustrated. In the 802.16e standard, an OFDM symbol comprises a guard section having a guard section length, and a data interval having a data interval length. The guard section 12 copies a portion of the data, such as the first data interval 11, thus, the signal correlation value between the guard section 12 and the first data interval 11 is significantly large. Thus it can be determined that the length between the two maximum values, P1 and P2, is the sum of the length of guard section 12 and the length of the data interval. For further illustration, please refer to FIG. 2. FIG. 2 shows a signal correlation output diagram for an OFDM symbol in 1/16 mode. In this diagram, the position of the first maximum value P1 defines the first symbol boundary, and the signal correlation values at the positions having a distance of the OFDM symbol length are acquired in accordance with all possible guard section lengths from the first symbol boundary. In this embodiment, the OFDM system has comprises four guard sections respectively having lengths of 1/4, 1/8, 1/16 or 1/32 of an actual data interval length of an OFDM symbol, $N_{FFT}$. The diagram shows that the maximum correlation value is generated at the position having a distance of $(N_{FFT}+N_{FFT}/16)$ from the first symbol boundary. Although a precise symbol boundary position, such as the described first symbol boundary shown in FIG. 2 provides better guard section length detection, a position with a local maximum signal correlation value can also be deemed as the symbol boundary. The computation of the signal correlation value is described as the following expression.

$$c(n) = \sum_{k=n}^{n+L-1} r(k)r^*(k - N_{FFT}) \qquad (I)$$

The expression (I) shows the computation of the signal correlation value, wherein r(n) is the received signal, n is the sample index, $N_{FFT}$ is the data interval length of an OFDM symbol, and L is the length of the sliding window. The sliding window is a variable-duration window.

Figure 3:
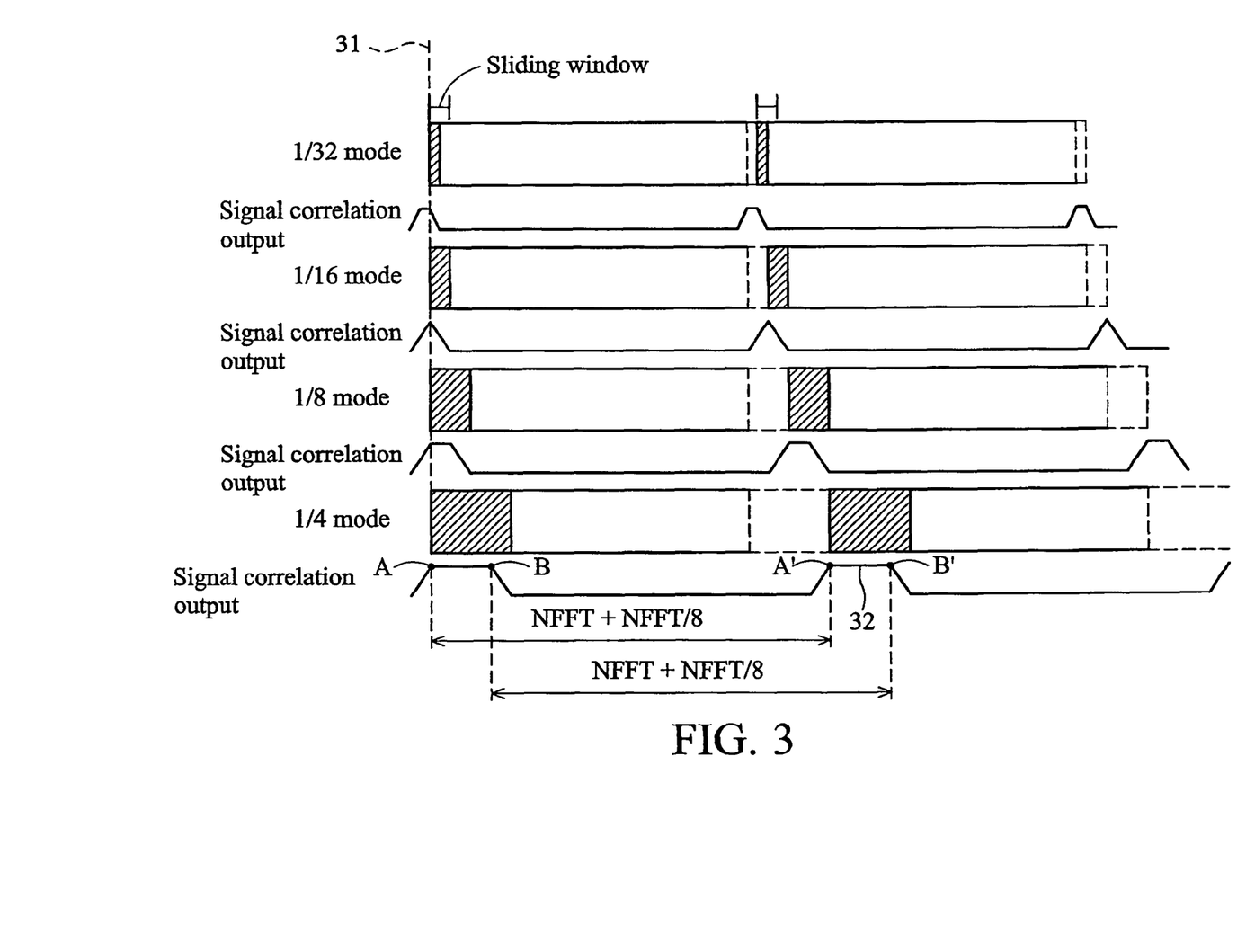
FIG. 3 shows another signal correlation output diagram for an OFDM symbol in different mode in a OFDM system.

FIG. 3 shows another signal correlation output diagram for an OFDM symbol in a different mode in an OFDM system. Since the actual guard section length is unknown, the length of the sliding window is set to one possible guard section length. In this embodiment, the length of the sliding window is $N_{FFT}/16$, wherein $N_{FFT}$ is the length of the data interval in an OFDM symbol. At first, the first symbol boundary 31 is determined. Then, calculating the signal correlation output by the sliding window at positions having a distance of an OFDM symbol length in different modes from the first symbol boundary 31. In FIG. 3, we can find that only the signal correlation output in 1/16 mode has two peak values. This is because that the predicted guard section length, i.e. the length of the sliding window, may be not the correct guard section length. Thus, a tableland, such as the tableland 32, may occur in the signal correlation output. Even if the signal correlation output does not provide two perfect peak values, the signal correlation output still provides enough information for guard section length detection. According to the signal correlation output in 1/4 mode, we can find that the length between two points, A and A', or B and B', are the same. Thus, the length of the sliding window can be just one possible guard section length, and the first symbol boundary is determined at the position with a local maximum signal correlation value.

Figure 4:
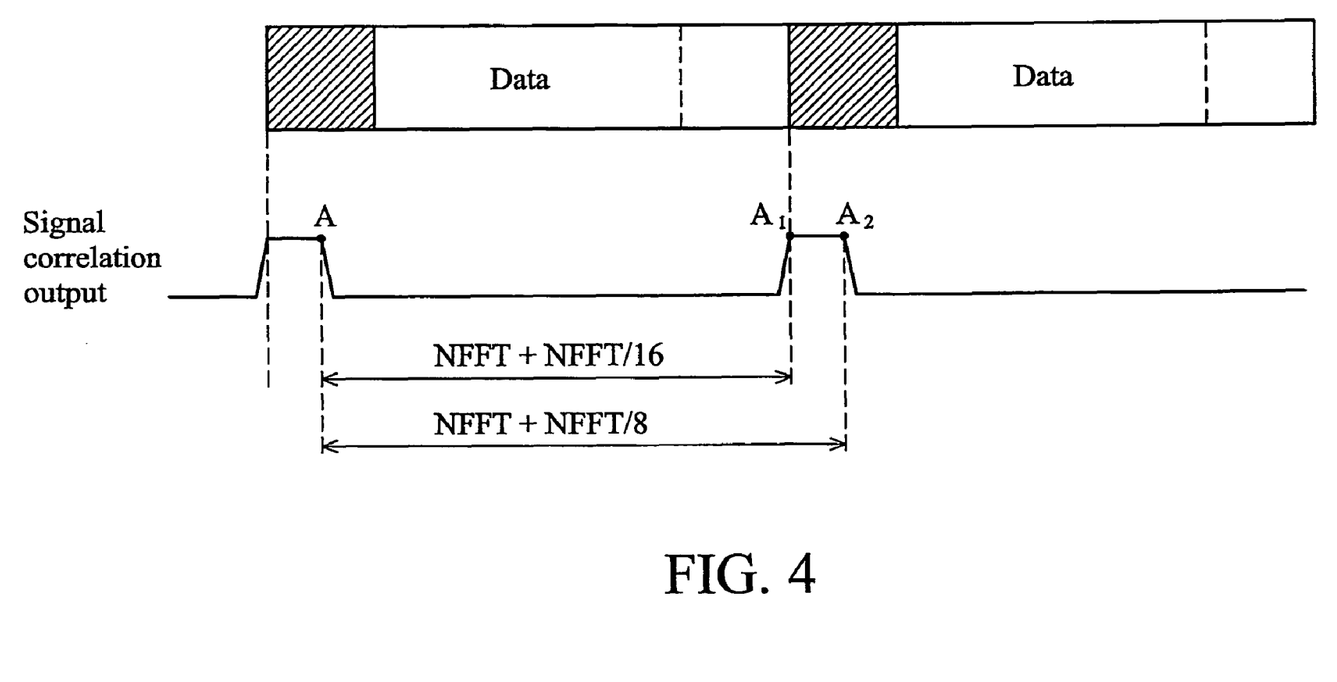
FIG. 4 shows a signal correlation output diagram in ⅛ mode.
Figure 5:
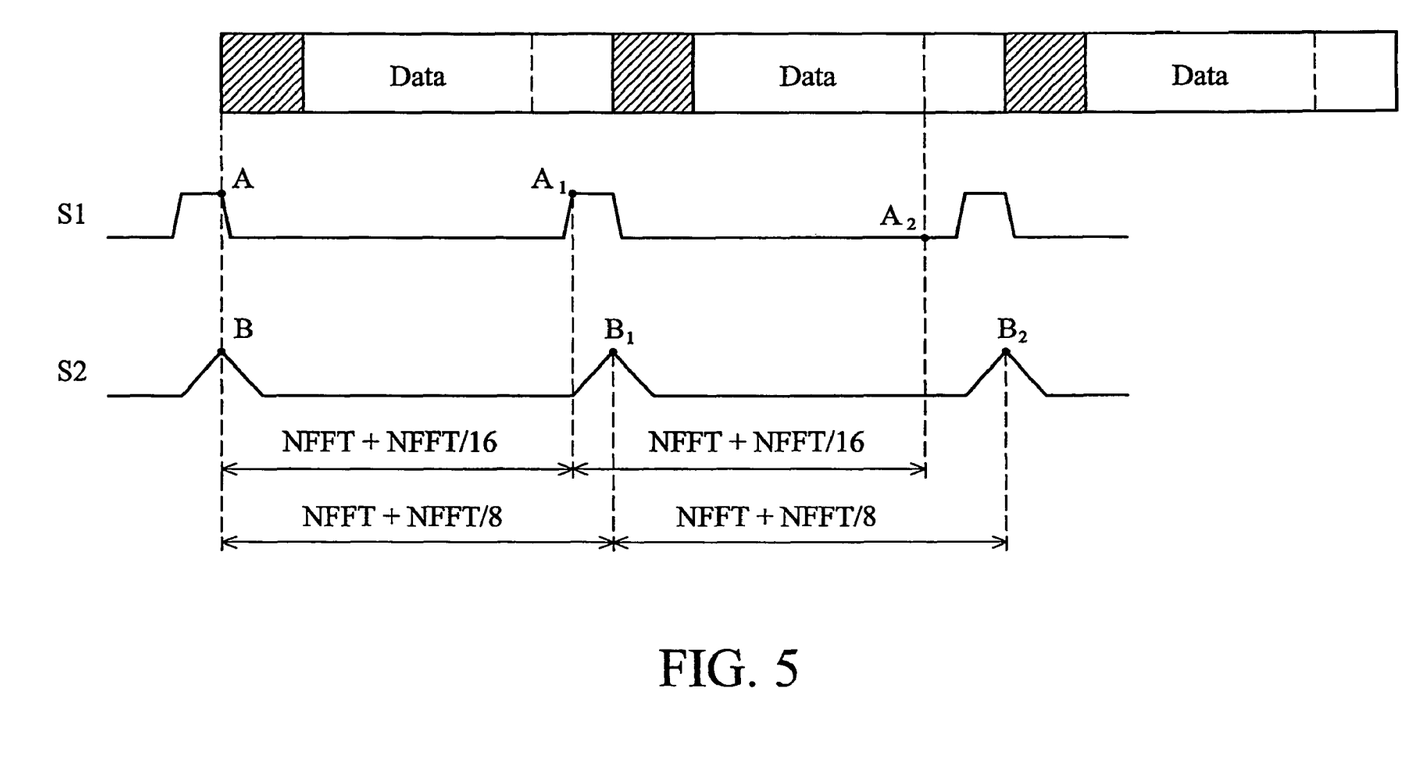
FIG. 5 shows two signal correlation output signal based on the symbols in 1/16 mode and ⅛ mode.

Although the detection method described in FIG. 1 to FIG. 3 provides an effective guard section detecting method, the guard section length may still be incorrectly determined. Please refer to FIG. 4. FIG. 4 shows a signal correlation output diagram in 1/8 mode. In FIG. 4, the first symbol boundary is determined at the point A, and the actual guard section length is $N_{FFT}/8$. However, both the correlation values of points A1 and A2 respectively having a distance of $(N_{FFT}+N_{FFT}/16)$ or $(N_{FFT}+N_{FFT}/8)$ from the first symbol boundary have a local maximum signal correlation value. This may cause incorrect guard section length detection. FIG. 5 illustrates a solution to this problem. FIG. 5 shows two signal correlation output signals S1 and S2 respectively based on the symbols in 1/16 mode and 1/8 mode. Suppose the actual guard section length is $N_{FFT}/8$, and the points A and B are located at the first symbol boundary, and both the points A1 and B1 respectively at a distance of $(N_{FFT}+N_{FFT}/16)$ or $(N_{FFT}+N_{FFT}/8)$ from the first symbol boundary have a local maximum signal correlation value. If we calculate the signal correlation values at points A2 and B2 respectively having a distance of $(N_{FFT}+N_{FFT}/16)$ or $(N_{FFT}+N_{FFT}/8)$ from the points A1 or B1, only the point B2 has a local maximum signal correlation value. Thus, the guard section length detection can be determined by calculating the signal correlation values at the point having a distance of $x \cdot (N_{FFT}+N_{GI})$ from the first symbol boundary, wherein x is equal to or greater than 2, $N_{FFT}$ is the length of the data interval in an OFDM symbol, and $N_{GI}$ is the length of the guard section. In the OFDMA system, four guard sections respectively having lengths of 1/4, 1/8, 1/16 or 1/32 of an actual data interval length of an OFDM symbol are provided.

Although the guard section length detection can be determined by calculating the signal correlation values at the point having a distance of $x \cdot (N_{FFT}+N_{GI})$ from the first symbol boundary, unnecessary correlation computations waste the system resource and cost time if the selected value, x, is too large. Take IEEE 802.16e as an example, a preferred embodiment of the range of x is described by the following expression.

$$\left(N_{FFT} + \frac{N_{FFT}}{32}\right) \cdot x \geq \left(N_{FFT} + \frac{N_{FFT}}{4}\right) \cdot (x-1) \Rightarrow x \leq \frac{40}{7} \qquad (II)$$

$$\therefore x_{\max} = 5$$

According to the description of FIG. 5 and expression (II), the preferred embodiment of the range of x is between 2 and 5, i.e., $2 \leq x \leq 5$. In another embodiment of the invention, the correlation values of $x \cdot (N_{FFT}+N_{GI})$, $2 \leq x \leq 5$, are evaluated and averaged, and the guard section length can be determined based on the maximum averaged correlation value. The calculation of x in IEEE 802.16e is an example, and does not limits the invention.

Figure 6:
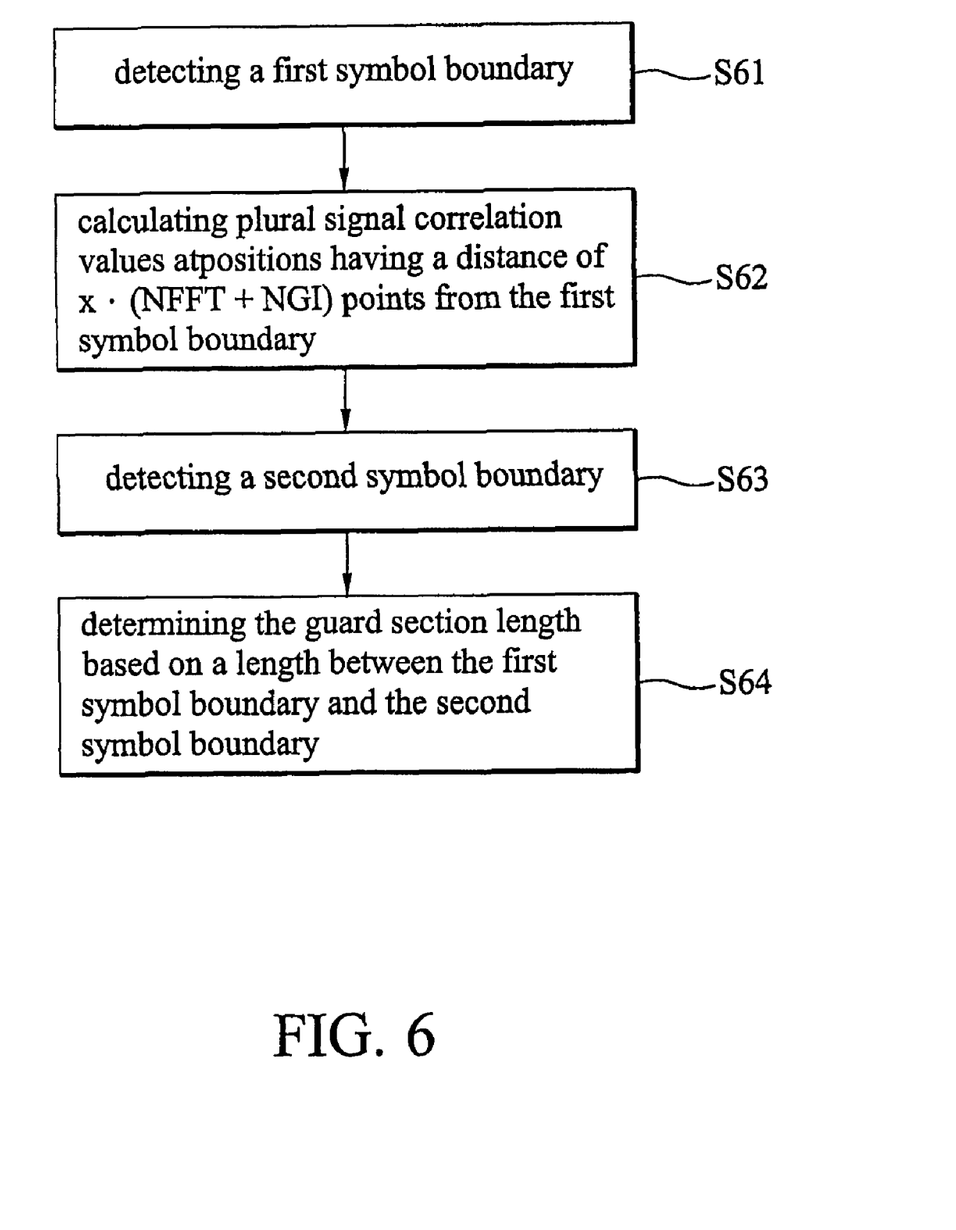
FIG. 6 shows a flowchart of a guard section length detection method of one embodiment of the disclosure.

FIG. 6 shows a flowchart of a guard section length detection method of one embodiment of the disclosure. In step S61, a first symbol boundary is determined. A local maximum signal correlation value calculated using a sliding window determines the first symbol boundary, wherein the length of the sliding window is selected from one of the possible guard section lengths of the OFDM system. The OFDMA system in this embodiment for example, comprises four possible guard section lengths respectively having lengths of ¼, ⅛, ​1/16 or ​1/32 of an actual data interval length of an OFDM symbol. Subsequent to determining the first symbol boundary in step S62, the sliding window calculates a plurality of signal correlation values at positions having a distance of $x \cdot (N_{FFT}+N_{GI})$ points from the first symbol boundary (in this embodiment x is between 2 and 5), the $N_{FFT}$ is the data interval length of an OFDM symbol, and $N_{GI}$ is the guard section length. In this embodiment, all four possible guard lengths are tested to determine whether a local maximum signal correlation value or a maximum signal correlation value has occurred. In step S63, a second symbol boundary is determined based on the signal correlation values, i.e., the second symbol boundary is determined at the position having a local maximum signal correlation value or a maximum signal correlation value. In step S64, the guard section length is determined based on the length between the first symbol boundary and the second symbol boundary.

Figure 7:
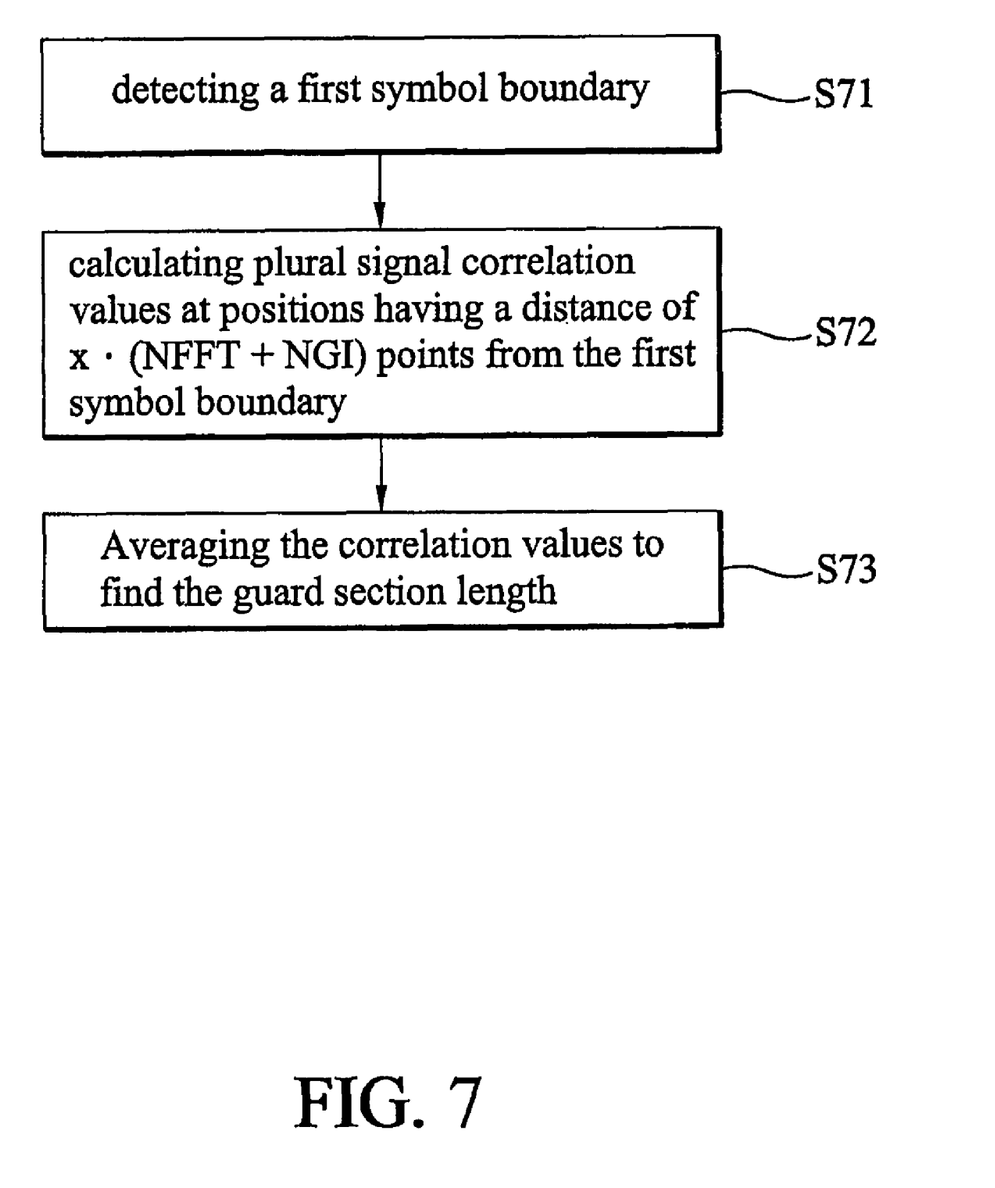
FIG. 7 shows a flowchart of a guard section length detection method of another embodiment of the disclosure.

FIG. 7 shows a flowchart of a guard section length detection method of another embodiment of the disclosure. In step S71, a first symbol boundary is determined. The first symbol boundary is determined by a local maximum signal correlation value calculated by using a sliding window, wherein the length of the sliding window is selected from one of the possible guard section lengths of the OFDM system. Take the OFDMA system in this embodiment for example, the OFDMA system comprises four possible guard section lengths respectively having a length of ¼, ⅛, ​1/16 or ​1/32 of an actual data interval length of an OFDM symbol. After the first symbol boundary is determined, in the step S72, the sliding window calculates plural signal correlation values at positions having a distance of $x \cdot (N_{FFT}+N_{GI})$ points from the first symbol boundary (in this embodiment x is between 2 and 5), the $N_{FFT}$ is the data interval length of an OFDM symbol, and $N_{GI}$ is the guard section length. In this embodiment, all four possible guard lengths are tested to determine whether a local maximum signal correlation value or a maximum signal correlation value has occurred. In this embodiment, the correlation values of $x \cdot (N_{FFT}+N_{GI})$, $2 \leq x \leq 5$, are evaluated and averaged, and the guard section length can be determined based on the maximum averaged correlation value. Some or all of the correlation values may be used to evaluate and average.

Figure 8:
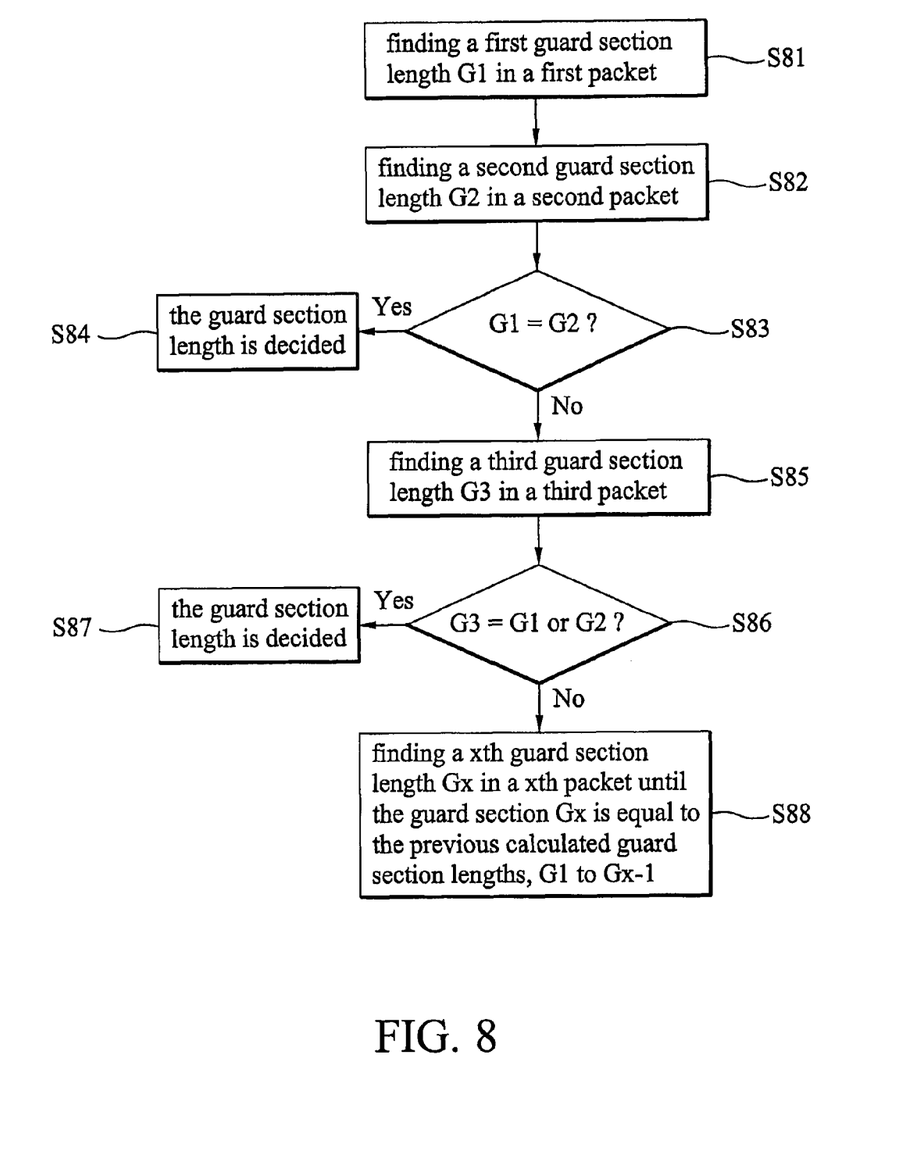
FIG. 8 shows a flowchart of an interactive guard section length detection method of another embodiment of the disclosure.

FIG. 8 shows a flowchart of another embodiment of an iterative guard section length detection method. In step S81, a first guard section length $G_1$ in a first packet is determined. In one embodiment, the first guard section length $G_1$ is determined by the method illustrated in FIGS. 6 and 7 or any guard section length detection method. In step S82, a second guard section length $G_2$ in a second packet is determined. In one embodiment, the second guard section length $G_2$ is determined by the method illustrated in FIG. 6 or FIG. 7. In step S83, if the first guard section length $G_1$ and the second guard section length $G_2$ are the same, the procedure advances to step S84 and the guard section length is determined, and if not, the procedure advances to step S85. In step S85, a third guard section length $G_3$ in a third packet is determined. In step S86, if the third guard section length $G_3$ is equal to the first guard section length $G_1$ or the second guard section length $G_2$, the procedure advances to step S87 and the guard section length is decided, but if not, the procedure advances to step S88 to find a guard section $G_x$ in an xth packet until the guard section length $G_x$ is equal to the previous calculated guard section lengths, $G_1$ to $G_{x-1}$. In the WiMAX standard, four guard section lengths are provided, thus, the maximum iterative number of guard section length detection is 5, i.e., 4+1=5. In another OFDM system having n types of guard section length, the maximum iterative number of guard section length detection is (n+1).

Figure 9:
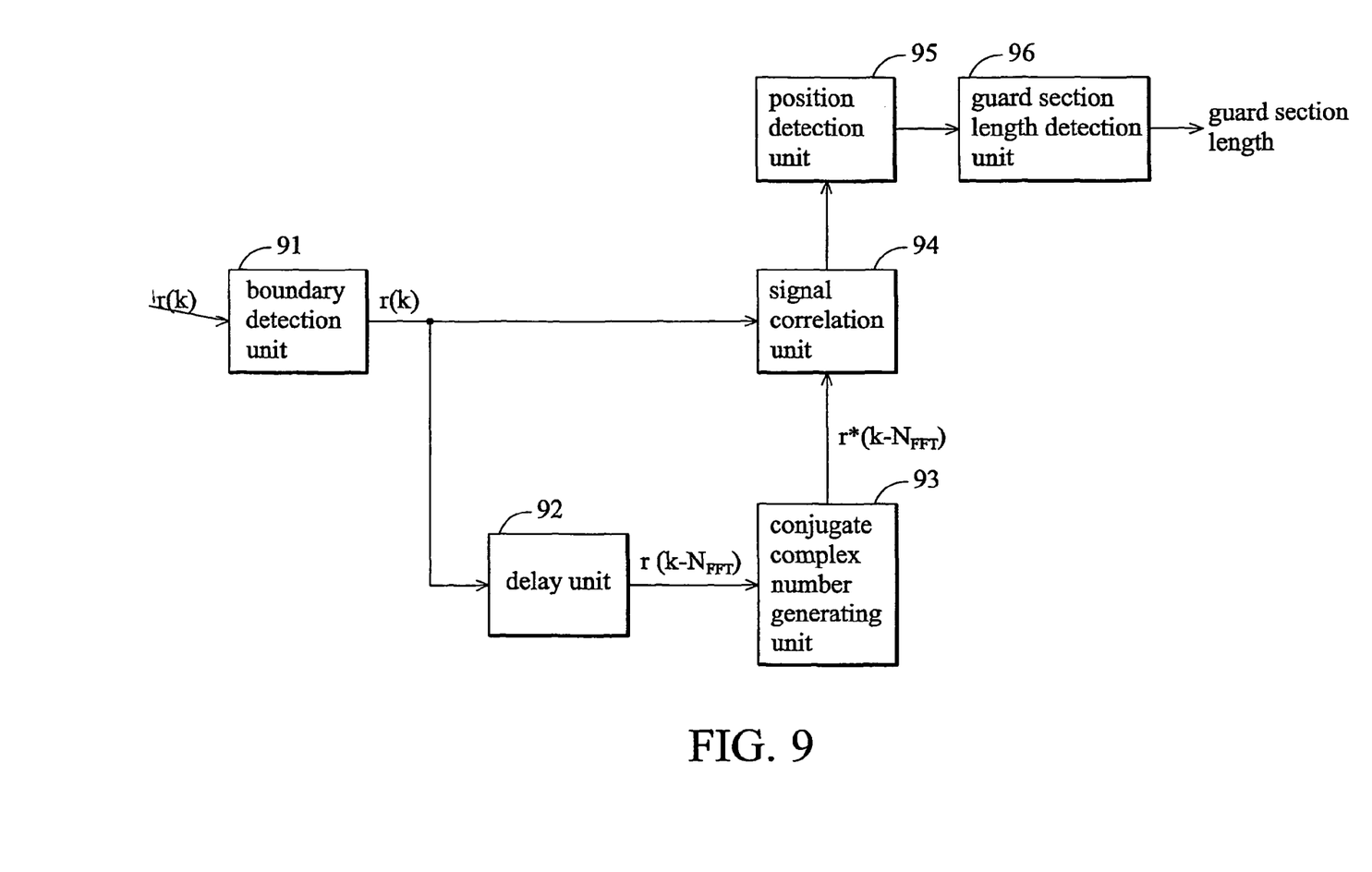
FIG. 9 is a block diagram illustrating an embodiment of a guard section length detection system of the invention.

FIG. 9 is a block diagram illustrating an embodiment of a guard section length detection system of the invention. The boundary detection unit 91 receives the input signal r(k) and detects a first boundary. In another embodiment, the input signal r(k) is processed by a quantization procedure or a down sampling procedure to decrease the complexity. The input signal r(k) is transmitted to the delay unit 92 to delay $N_{FFT}$ sampled points. The conjugate complex number generating unit 93 receives the signal $r(k-N_{FFT})$ and outputs its conjugate complex number $r^*(k-N_{FFT})$ to the signal correlation unit 94. The signal correlation unit 94 calculates the signal correlation value based on a sliding window length L as shown by the following equation.

$$c(n) = \sum_{k=n}^{n+L-1} r(k) r^*(k - N_{FFT})$$

The signal correlation unit 94 transmits the signal correlation value to the position detection unit 95 and the position detection unit 95 detects the position having a local maximum signal correlation value or a maximum signal correlation value and determines a second symbol boundary. The guard section length detection unit 96 determines the guard section length based on the length between the first symbol boundary and second symbol boundary.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A guard section length detection method used in an OFDM system, wherein an OFDM symbol comprises a data interval having a first length, and a guard section having a plurality kinds of guard section lengths, comprising:
    detecting a first symbol boundary;
    detecting a second symbol boundary, wherein the position of the second symbol boundary is determined by two maximum signal correlation values; and
    determining the guard section length based on a length between the first symbol boundary and the second symbol boundary.

2. The method as claimed in claim 1, wherein the first symbol boundary is determined by a local maximum signal correlation value.

3. The method as claimed in claim 1, wherein the position of the second symbol boundary is determined by at most five maximum signal correlation values.

4. The method as claimed in claim 1, wherein the guard section length is ¼, ⅛, ​1/16 or ​1/32 of the first length.

5. A guard section length detection system used in an OFDM system, wherein an OFDM symbol comprises a data interval having a first length, and a guard section having a plurality kinds of guard section lengths, comprising:
    a first boundary detection unit receiving an OFDM signal for detecting a first symbol boundary;

a second boundary detection unit receiving the input OFDM signal from the first boundary detection unit to detect a second symbol boundary, comprising:

a delay unit receiving and delaying the OFDM signal by a predetermined length;

a signal correlation unit calculating a signal correlation value based on the OFDM signal and the delayed OFDM signal; and a conjugate complex number generating unit receiving the delayed OFDM signal and generating a corresponding conjugate complex number; and a guard section length detection unit for determining the guard section length based on the length between the first symbol boundary and the second symbol boundary.

6. The system as claimed in claim 5, further comprising a position detection unit receiving the signal correlation value and outputting a position data in response to the received signal correlation value being a local maximum value or a maximum value.

7. The system as claimed in claim 5, further comprising a signal correlation unit calculating a plurality of signal correlation values based on the guard section lengths.

8. The system as claimed in claim 7, further comprising a position detection unit receiving the signal correlation value and outputting the second symbol boundary in response to the received signal correlation value being a local maximum value or a maximum value.

9. A guard section length detection method for an OFDM system wherein an OFDM symbol comprises a data interval having a first length, and four kinds of guard sections respectively called ¼ mode, ⅛ mode, ​1/16 mode and ​1/32 mode guard sections, comprising:

detecting a first symbol boundary;

determining the four OFDM symbol lengths of the four guard sections;

calculating signal correlation values at the positions having a distance of at least two OFDM symbol lengths from the first symbol boundary; and determining an actual guard length in response to the signal correlation value being a local maximum value or a maximum value.

10. The method as claimed in claim 9, wherein a sliding window is used to calculate signal correlation values.

11. The method as claimed in claim 10, wherein a length of the sliding window is set to a ​1/32 mode guard section.

12. The method as claimed in claim 9, wherein the first symbol boundary is determined by a local maximum signal correlation value.

13. A guard section length detection method for an OFDM system, comprising:

detecting a first guard section in a first packet;

detecting a second guard section in a second packet;

if the first guard section length and the second guard section length are the same, the guard section length for the OFDM system is the first guard section; and if the first guard section length and the second guard section length are not the same, detecting a third guard section in a third packet. If the third guard section length is the same as either the first or the second guard section length, the guard section length for the OFDM system is the third guard section.

14. The method as claimed in claim 13, wherein if the OFDM system defines N guard section lengths, the maximum number of guard section length detections is (N+1).

* * * * *